United States Patent [19]
Barszczewski et al.

[11] 4,087,816
[45] May 2, 1978

[54] VLF RADIO POSITION LOCATION SYSTEM
[75] Inventors: Andrzej Barszczewski, Ottawa; Charles D. Hardwick, Manotick, both of Canada
[73] Assignee: Canadian Patents & Development Limited, Ottawa, Canada
[21] Appl. No.: 734,817
[22] Filed: Oct. 22, 1976
[30] Foreign Application Priority Data
Dec. 19, 1975 Canada .................................. 242153
[51] Int. Cl.² ........................... G01S 1/30; G01S 5/14
[52] U.S. Cl. ................................ 343/105 R; 343/103; 343/112 D
[58] Field of Search ................ 343/112 D, 103, 105 R
[56] References Cited
PUBLICATIONS
Navigation, vol. 21, No. 2, Summer 1974, pp. 117–133.
Western Electric Eng., vol. 16, No. 4, Oct. 1972, pp. 2–7.

Primary Examiner—Howard A. Birmiel
Assistant Examiner—Richard E. Berger
Attorney, Agent, or Firm—James R. Hughes

[57] ABSTRACT

A low frequency radio position location system for aircraft or other vehicles for operating in conjunction with ground stations transmitting at a first VLF radio frequency which is shifted in frequency by a small amount to a second frequency at fixed intervals with the shifting being carried out coherently with a defined transition point at the frequency signal is made up of an RF receiver and amplifier, a phase-locked loop for providing a continuous output frequency signal precisely locked to the first frequency, a detector for deriving a signal at the modulation frequency, a phase comparator for comparing the phase relationship of the derived modulation frequency signal to the phase relationship of the output frequency signal and the second frequency signal. The derived modulation frequency signal and its phase information is then available for providing distance and position information in relation to the ground stations.

6 Claims, 13 Drawing Figures

VLF RADIO POSITION LOCATION SYSTEM

This invention relates to a low frequency radio position location system and more particularly to a navigation receiver for aircraft and other vehicles capable of decoding a time coherent frequency shift modulation which can be used for unambiguous position fixing.

The very low frequency (VLF) signals from U.S. Naval Communication Stations are in the frequency spectrum from 15 KHz to 25 KHz. The information is transmitted with frequency shift keying (FSK) modulation. The fundamental frequency ($f_o$) of transmission is a multiple of 100 Hz while the shift frequency ($f_1$) is higher by 50 Hz than the fundamental. The frequencies of these transmitters are very stable as they are derived from cesium beam standards and for navigational purposes they are time coherent as between stations. A 50 Hz frequency is associated with each transmitter which controls the FSK modulation giving 20 ms time slots which are also coherent between the stations, that is, the 20 ms. time bit allotments are fixed in time with respect to each other.

Several VLF navigation systems are in use at the present time but those known to the applicants suffer from the drawback that they derive position from the phase of the VLF carrier. Points of equal carrier phase are repeated at relatively short intervals across the surface of the earth (e.g. for 24 KHz, the phase repeats itself approximately every 12.5 Km. Thus with conventional hyperbolic fix systems, a so-called position ambiguity can occur every 6.25 Km.).

Furthermore, a conventional VLF navigation system must be initialized at a known geographical position and the accuracy of subsequent navigation will be influenced by the accuracy of the starting coordinates.

It is an object of the present invention to provide a decoder or demodulator for a position fixing system that will extract the FSK or similar modulation signal from the higher frequency carrier signal such as to give a precise, time coherent pulse signal suitable for relatively navigation purposes and which allows navigation without initial position information.

This and other objects of the invention are obtained by a low frequency radio position location system for aircraft or other vehicles and adapted for operating in conjunction with ground stations transmitting at a first VLF radio frequency which is shifted in frequency by a small amount to a second frequency at fixed intervals said shifting being carried out coherently with a defined transition point at the shifting time, said shifted frequency constituting a modulation frequency signal, comprising: an RF receiver and amplifier, a phase-locked loop for providing a continuous output frequency signal precisely locked to the first frequency, means for deriving a signal at the modulation frequency, phase comparison means for comparing the phase relationship of the derived modulation frequency signal to the phase relationship of the said output frequency signal and the second frequency signal, the said derived modulation frequency signal and its phase information then available for providing distance and position information in relation to said ground station.

In a preferred embodiment of the invention the said first and second VLF radio signals are reduced to lower frequency signals by frequency conversion in a mixer.

In drawings which illustrate an embodiment of the invention.

Figures 1, 2, 3:
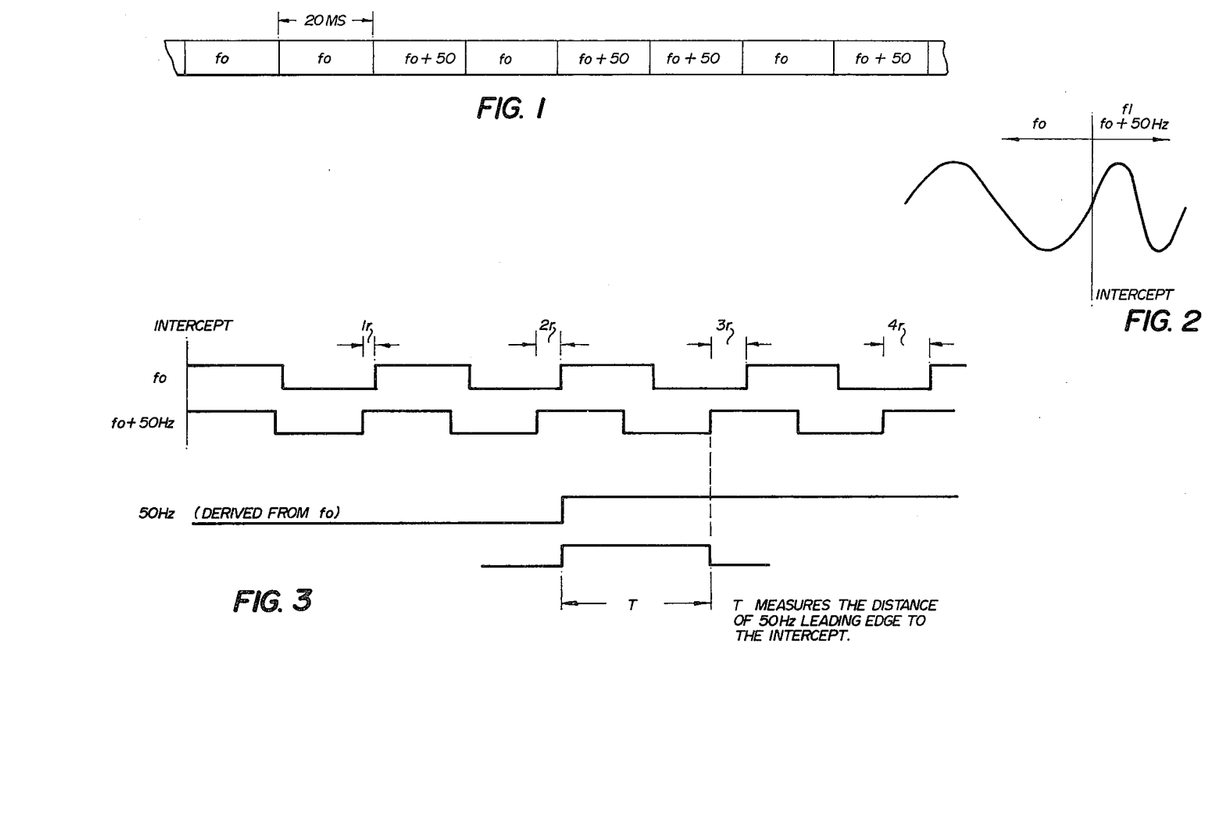
FIG. 1 shows a typical FSK transmission format.
FIG. 2 illustrates the intercept point of carrier and shifted frequency.
FIG. 3 indicates the time relation between the carrier, the shifted carrier and 50 Hz frequencies.

Referring to FIGS. 1 and 2, the basic transmission format of the VLF Communication Stations is shown. These FSK signals contain two components, $f_o$ which is the carrier and $f_1$ which is the carrier $\pm \alpha f$ (normally 50 Hz). The boundary between $f_o$ and $f_1$ is expanded to show the continuity at the intercept point of the two frequencies. For navigation purposes, it is the point in time where $f_o$ transistions to $f_1$ (and vice versa) that is of interest and it is the function of the decoder described below to determine this point which can then be used for various navigational purposes including distance measurement and position fixing. If the signals of the two frequencies ($f_o$ and $f_1$) are hard limited and plotted on the same time scale as shown in FIG. 3 it will be seen that the time difference between the leading edges increases linearly from the intercept through one 50 Hz cycle until coincidence is reached at the next intercept, 20 milliseconds later. The limited input signal (containing both $f_o$ and $f_1$) is compared with a pure $f_o$ recovered and remembered from the carrier by a phaselocked loop (PLL). If a comparison is made every 20 milliseconds (i.e., 50 times per second), at the times when the signal is keyed to $f_1$ there will be some "fixed" delayed $T = n\tau$ as shown in FIG. 3. When the input signal is at the carrier frequency, the two waveforms will be coincident. Thus the delay, $T = n\tau$ where $$\tau = \frac{1}{f_o} - \frac{1}{f_o + 50}$$

and $n$ is an integer from 1 to $f_o/50$, is a measure of where the intercept between $f_o$ and $f_o$ occurs in time. Stated somewhat differently, if a 50 Hz signal derived from $f_o$ by means of frequency division is used for the comparison, $T$ can be measured and readily adjusted e.g. by a digital servoloop or manually until it equals 0 at the intercept point at which time the leading edge of the 50 Hz corresponds in time to the transition between the two frequencies and is then useful and useable for navigation purposes. It should be pointed out that to obtain coincidence, the adjustments to $T$ will be in integral periods of $f_o$ which means that the process is reasonably independent of phase jitter in $f_1$. The frequency $f_1$ is simply used to adjust the 50 Hz phase in relation to the correct cycle of $f_o$. It should also be noted that once the adjustment for coincidence has been made, navigation accuracy is independent of $f_1$. To reduce the effects of possible phase jitter, a number of measurements of the delay $T$ may be made and the results averaged. For example, the measurement could be made $2^p$ times with a binary counter, rejecting the $p$ least significant digits. A number in the counter would then be related to the number of cycles the intercept is away from the actual point of measurement.

Identification of the correct carrier cycle that corresponds to the intercept point could be made using $f_o$ and $f_1$ as described above, however, in order to increase the tolerance on the precision of the measurement of $T$, the measurement is done at an intermediate frequency (e.g. 1 KHz) with a frequency of 1.050 KHz then corresponding to $f_1$. Conversion may be done using conventional mixing techniques. It should be pointed that in a mixer used to generate the IF, the phase relationships of the original signal are preserved. Given a mixer (multiplier) with inputs sin $(\omega_1 t + \phi)$ and sin $\omega_2 t$, the output will be:

$$e_o = \sin(\omega_1 t + \phi) \sin \omega_2 t = \tfrac{1}{2} \cos[\{(\omega_1 - \omega_2)t + \phi\} - \cos\{\omega_1 - \omega_2)t + \phi\}]$$

After a low pass filter only $\tfrac{1}{2} \cos [(\omega_1 - \omega_2)t + \phi]$ will remain showing that the phase relationship ($\phi$) is preserved through the mixer. (A constant additional fixed phase shift of e.g. $\pi/2$ may also be involved but this of course presents no problem).

Figure 4:
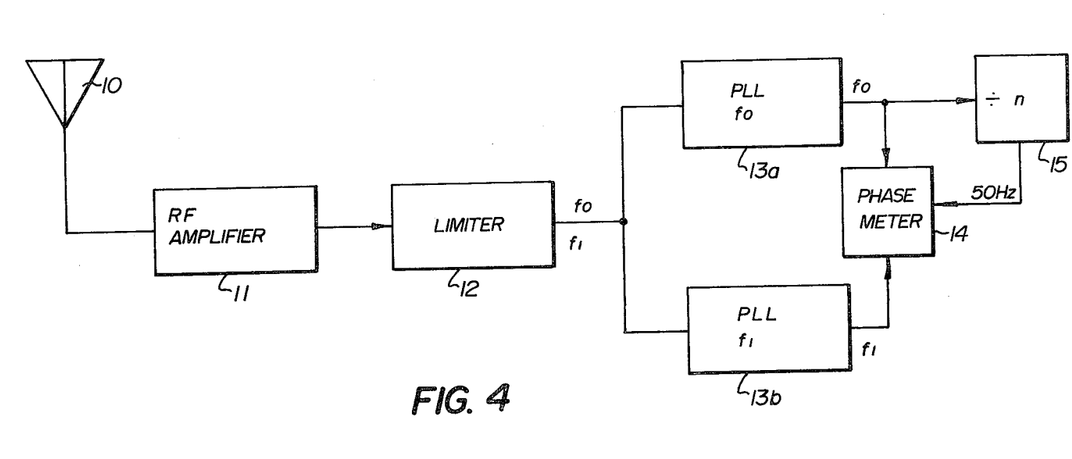
FIG. 4 is a block diagram of a navigation receiver incorporating the decoder.
Figure 5:
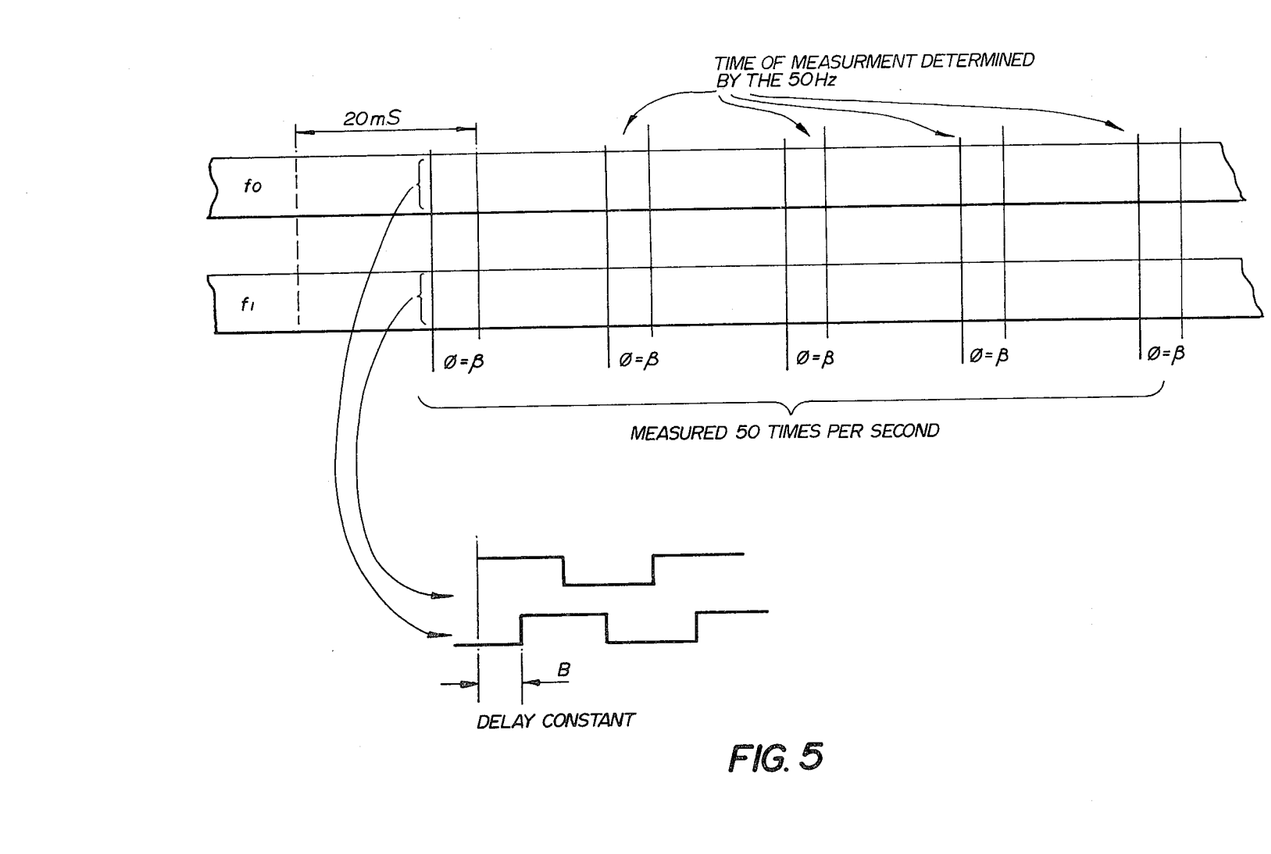
FIG. 5 shows the waveforms associated with FIG. 4.

FIG. 4 shows a block diagram of the receiver comprising antenna 10, RF amplifier 11, limiter 12 and the decoder comprising phase locked loops 13a and 13b plus output measuring circuitry. The RF amplifier is preferably a broadband stage located at the root of the antenna followed by 3 stagger-tuned stages delay equalized for $f_o$ and $f_1$. The phase-locked loops lock their respective channels onto $f_o$ and $f_1$ and the phase of these signals is measured in phase meter 14. The $f_o$ signal is divided down in divider 15 to the FSK modulation frequency e.g. 50 Hz. The phase of this signal is compared with the in-phase point (transition) between $f_o$ and $f_1$ as determined by phase meter 14. As shown in diagrams of FIG. 5, the phase delay between these is a constant (B). The FSK modulation frequency has now been derived and its phase determined. This circuit operates in a generally satisfactory manner under some conditions but is far from optimum.

Figure 6:
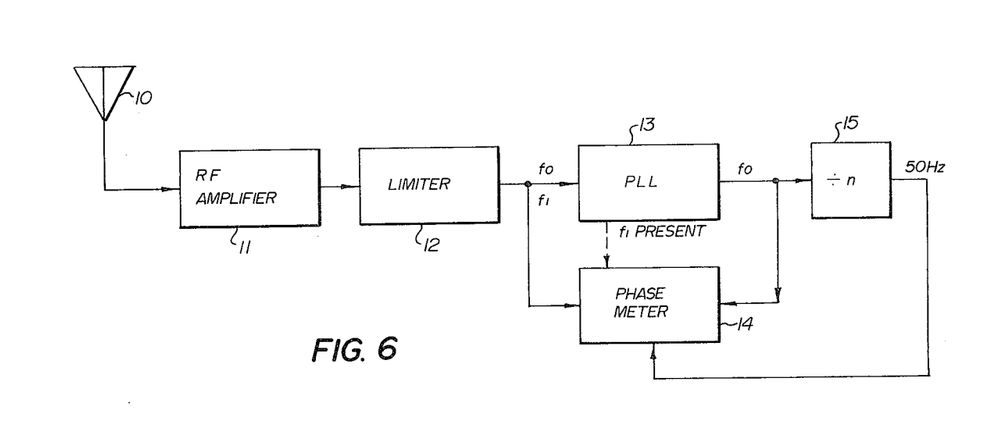
FIG. 6 is a block diagram of a variant form of decoder.
Figure 7:
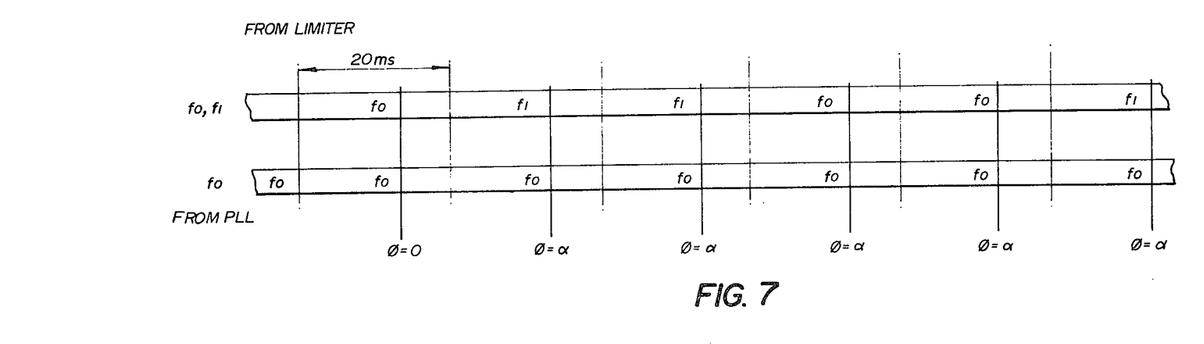
FIG. 7 shows waveforms associated with FIG. 6.

FIG. 6 and associated phase format diagram (FIG. 7) derives from FIG. 4. In this case the phase meter 14 sees either a phase angle $\alpha$ when the carrier is equal to $f_1$ or zero phase angle when the carrier is $f_o$. The presence of $f_1$ can be obtained from the phase detector of the PLL.

Figure 8:
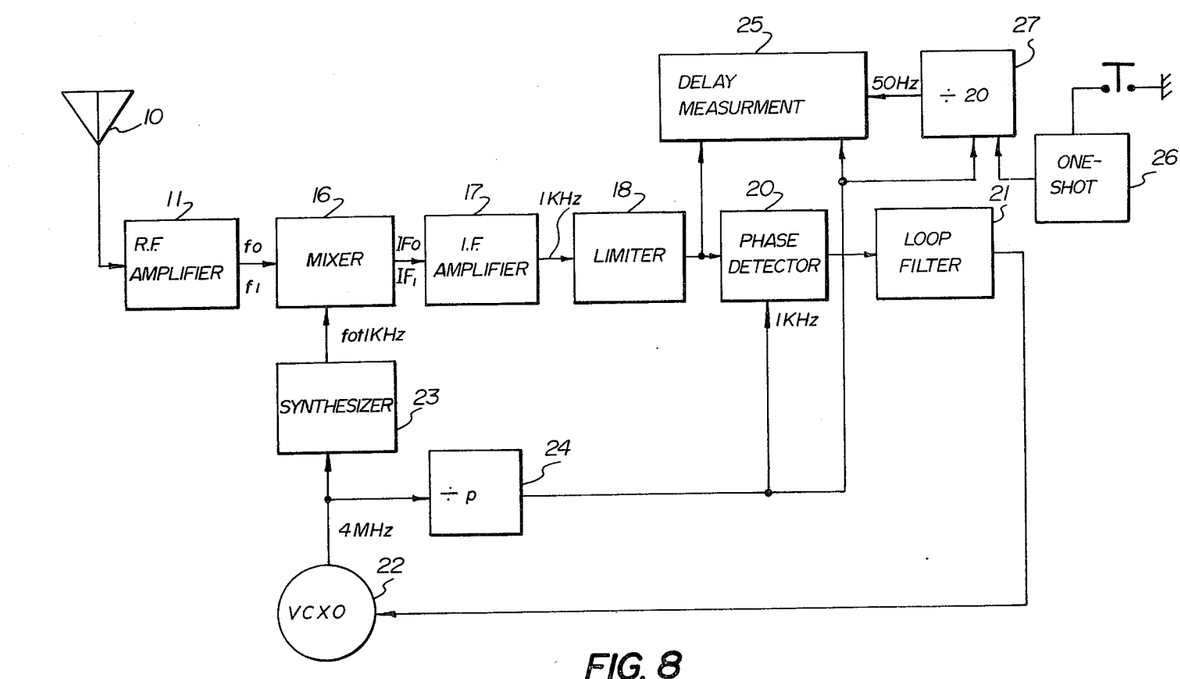
FIG. 8 is a block diagram of a preferred form of receiver and decoder.

FIG. 8 illustrates the preferred form of the device and in this version, the carrier signal frequencies ($f_o$ and $f_1$) are lowered in frequency by heterodyning. The output of mixer 16 is a 1 KHz (and 1.050 KHz) signal and this is fed to IF amplifier 17 and hard limiter 18 and then to a phase-locked loop (PLL) made up of phase detector 20 and loop filter 21 controlling a voltage controlled crystal oscillator 22. The latter device provides a convenient 4 MHz output from which is derived a local oscillator frequency of $f_o$ + 1 KHz by synthesizer 23 for application to mixer 16. The circuit in effect derives a 50 Hz signal from 1 KHz by means of division. This 50 Hz signal is adjusted in phase (and therefore in time) until it is coincident with the transition between $f_o$ and $f_1$ and after this cycle matching technique has been carried out, the 50 Hz will track the transition point until loss of signal, at which time the cycle-matching procedure is repeated. The phase of the 1 KHz input signal from the IF amplifier is measured in phase detector 20 in relation to a reference 1 KHz derived from crystal control oscillator 22 via a dividing network 24 which divides the 4 MHz from oscillator 22 by some convenient factor "p", in this case 4000. The main advantage of using frequency conversion i.e., heterodyning, is that while it preserves the phase relations in the IF, it reduces effectively the number of cycles per 20 ms (50 Hz) period, allowing much more latitude in the precision of the measurement required. $\tau$ per cycle is $(1/1000) - (1/1050) \simeq 50$ $\mu$s. Thus a delay measurement of accuracy of say $\pm$ 20 $\mu$s is all that is necessary to measure uniquely the number of cycles to or from the intercept.

The delay can be measured in various ways. A simple non-automatic delay measurement device 25 comprises an oscilloscope and a one-shot circuit. Pulses are added normally using a one-shot circuit 26 connected to the divider 27 that produces 50 Hz from 1 KHz. Each pulse added moves the leading edge of the 50 Hz by one 1 KHz cycle (1 msec) toward (or way from) the intercept until the intercept is at the origin of the sweep and thus the 50 Hz leading edge (zero crossing point) was coincident in time with the intercept which is what is required for navigation purpose.

Figure 9:
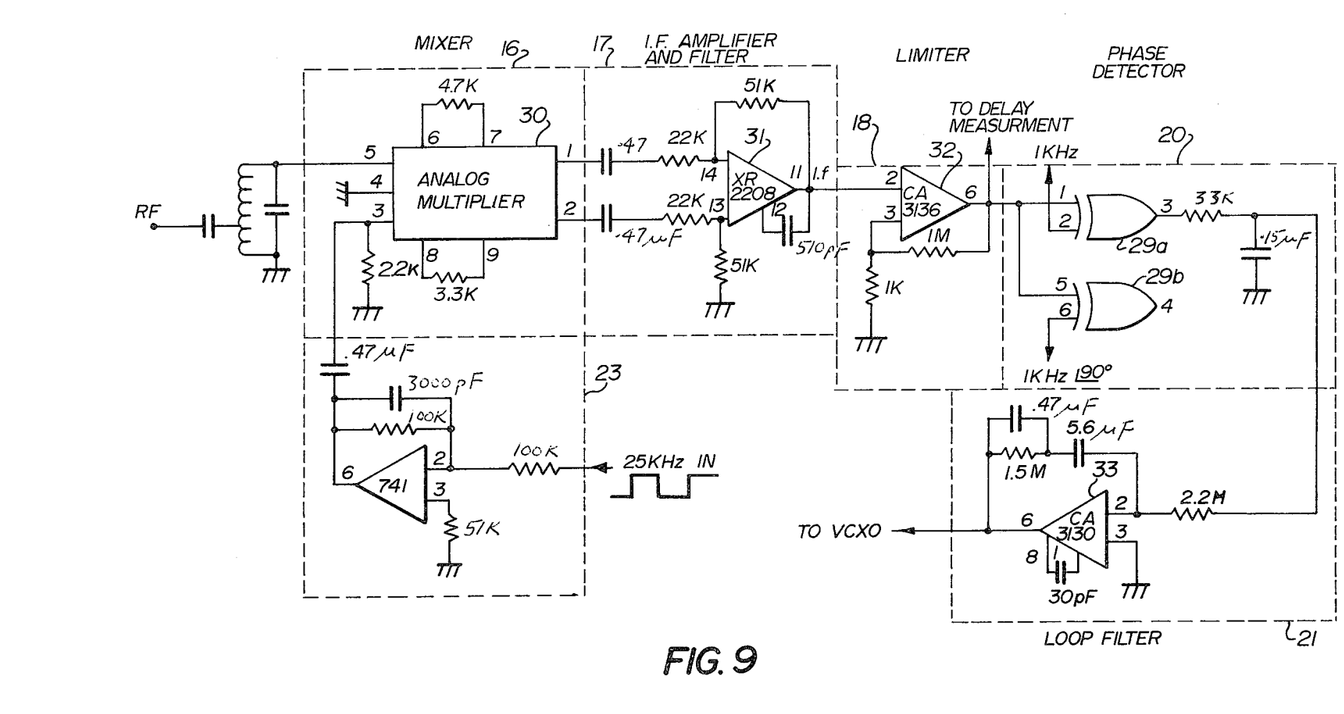
FIG. 9 is a more complete circuit diagram of the receiver, mixer, IF, limiter, phase detector, and loop filter portions of the FIG. 8 device.

Referring to FIG. 9, suitable circuitry for the mixer 16 IF amplifier and filter 17, limiter 18, phase detector 20, loop filter 21, and synthesizer 23 is shown. The mixer is an analog multiplier 30 and the IF amplifier is an operational amplifier 31 connected as a low pass filter. The limiter and PLL filter are operational amplifiers 32 and 33 having a MOSFET input and a good slewing rate. The phase detector is an exclusive OR circuit 29a, 29b.

Figure 10:
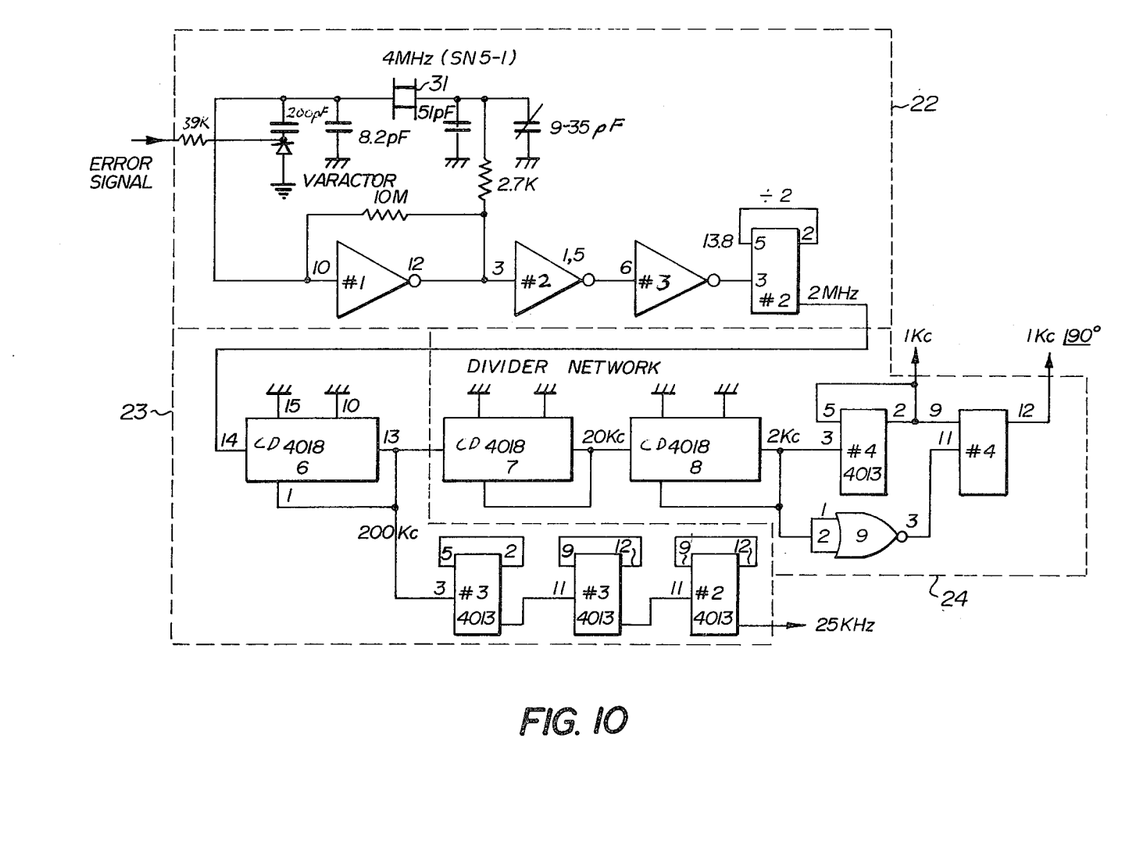
FIG. 10 is a circuit diagram of the voltage controlled oscillator, synthesizer, and frequency divider portion of the FIG. 8 device.

FIG. 10 shows the VCXO 22 and the local oscillator 23. The former is a 4 MHz quartz oscillator 31 with $\pm$ 12 ppm tuning range. The local oscillator frequency of 25 KHz ($f_o$ + 1 KHz) is obtained by division of 4 MHz from the oscillator. A frequency dividing network 35 provides the 1 KHz and 1 KHz $\angle 90°$ for the phase detectors 20 (of FIG. 9).

Figure 11:
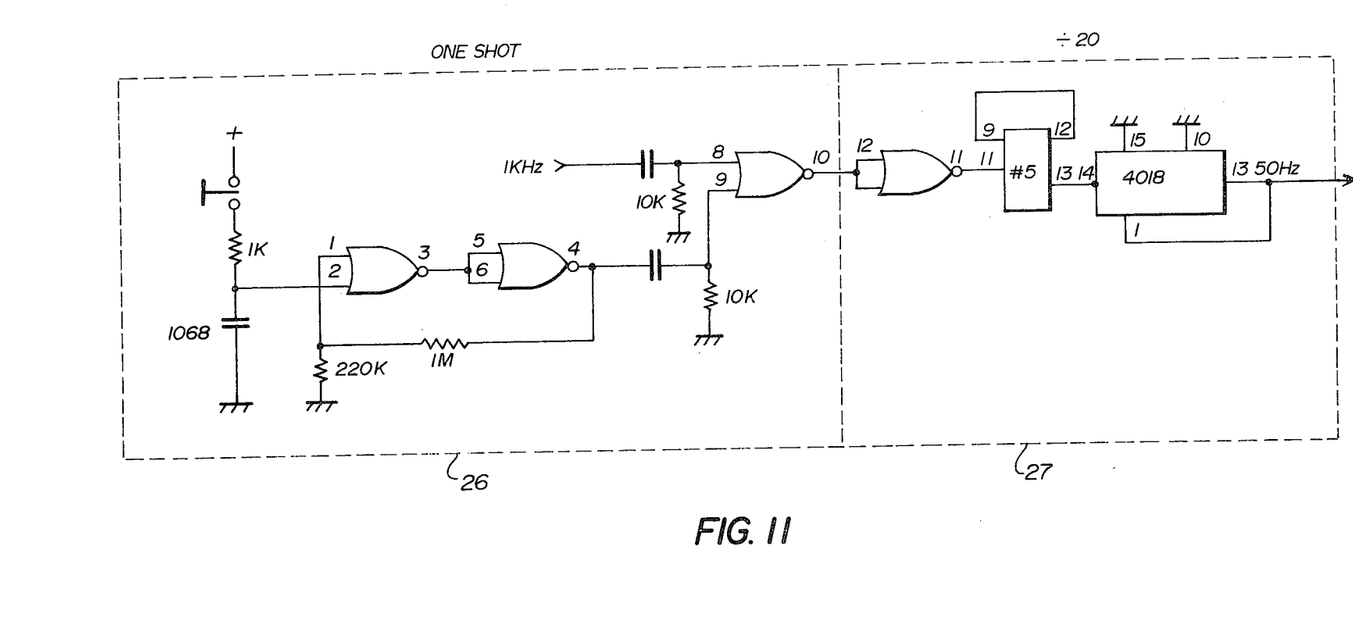
FIG. 11 is a diagram of the normal triggering and delay measurement portions of the circuit.

FIG. 11 illustrates a complete delay measurement circuit made up of a one-shot device 26 and divide-by-20 circuit 27.

In the above discussion the phase lock loop (PLL) acts as a very narrow band-pass filter and is a frequency memory for the time periods determined by the time constants of the low pass filter. The exclusive OR phase detector (20 of FIG. 9) has an output of zero average when the input dissappears, when the output is 50 Hz. The low pass filter 21 contains an integrator which is essentially an analog memory and its output remains unchanged with zero average input. It follows that the PLL "remembers" $f_o$ during $f_1$ bursts.

Figure 12:
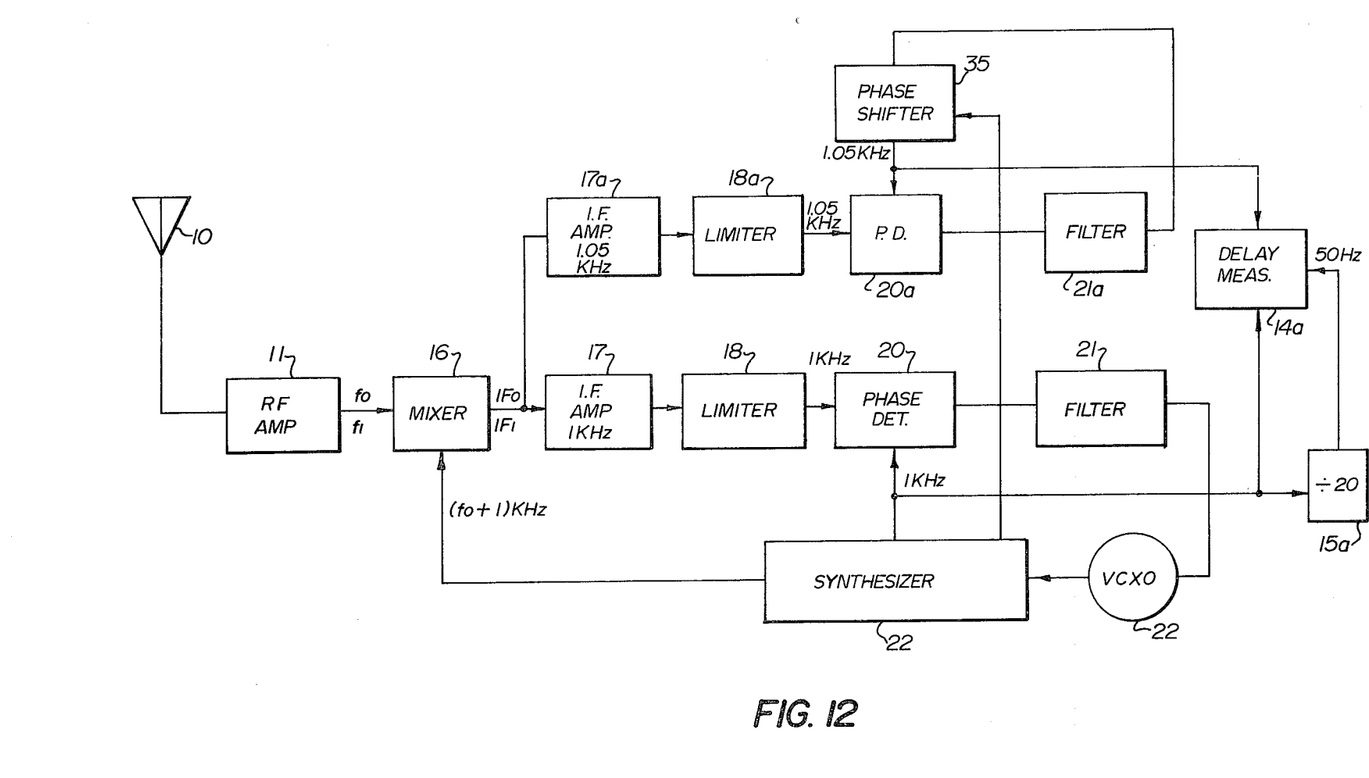
FIG. 12 is a block diagram of a receiver and decoder similar to that of FIG. 4 but with frequency conversion.

FIG. 12 shows an equivalent superheterodyne version of the circuit of FIG. 4. In this case the circuit is similar to that of FIG. 8 but with an additional PLL formed of IF, (1.05 KHz). This is made up of phase detector 20a, filter 21a, and phase shifter 35. As in the FIG. 4 version, the delay between the phase of the 50 Hz signal derived from $f_o$ and the in-phase relation between IF$_o$ (1 KHz) and IF$_1$ (1.05 KHz) is measured in phase meter 14a.

In the following discussion of the phase errors, it should be noted that these errors are inherent in all VLF receivers and not specifically to one using the 50Hz decoder. In other words, the use of the decoder is not expected to introduce any additional error to that inherent in conventional receivers, provided phase distortion and/or jitter is not so high that cycle identification cannot be carried out. As shown above, there is a fairly high tolerance especially if the IF technique is used.

The errors in correlating distance with the phase measurements are of two kinds, those generated within the receiver and those generated by anomalies of the propagation.

The propagation effects will generally limit the accuracy to 2 to 4 Km over 24 hours, with accuracies of better than 1 Km. achievable over short periods (several hours). Sudden ionospheric disturbances can, under exceptional circumstances give errors as high as 10 Km. There is ample literature covering these effects.

Figure 13:
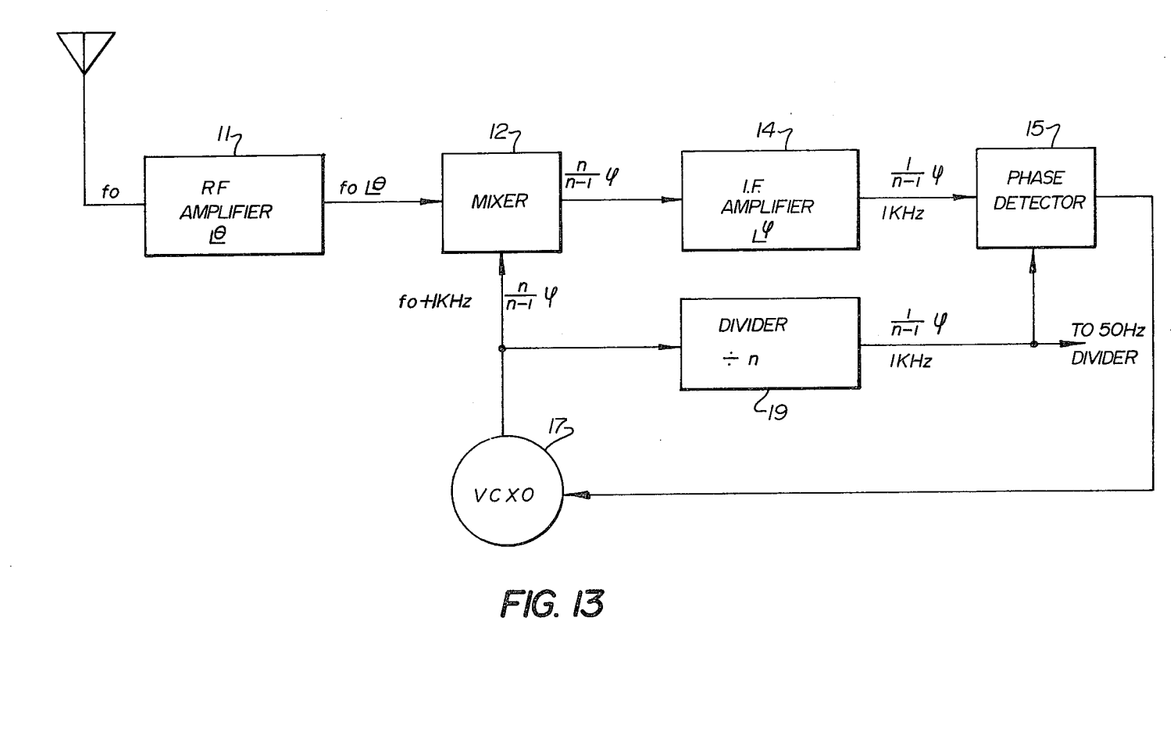
FIG. 13 is a block diagram illustrating phase errors in the receiver.

For estimates of receiver errors see FIG. 13. Let the RF amplifier 11 have phase error $\theta$. Since this error is outside of the PLL it appears as an error in distance $\epsilon_\theta = (\theta/2\pi) \lambda$ where $\lambda$ is the carrier wavelength. The amount of detuning caused by temperature variations, aging etc. is estimated at $\pm 15°$ which corresponds to $\pm (\lambda/24)$ or about $\pm 0.6$ Km. for a $f_o$ of 20 KHz. If the IF amplifier 14 (including the limiter) has a phase shift, the recovered 1 KHz will have an error $\epsilon_{1HKz} = (1/n-1) \phi$ where $n$ is local oscillator frequency ratio to 1 KHz or $n-1$ equals $f_o$ in KHz. It can be seen that the error due to IF is $$\epsilon_\phi = \frac{n}{n-1} \phi \cdot \frac{\lambda}{2n} \simeq \frac{\phi}{2n} \lambda$$

referred to the input of the receiver. $\phi$ is estimated to be 5° or less corresponding to an error of about 0.2 Km max.

The phase jitter caused by input noise can be as high as $\pm 2.5$ $\mu$s, corresponding $\pm 0.8$ Km. variation. The total error in the receiver should be within $\pm 1.5$ Km. With careful receiver design it probably would be reduced to $\pm 0.5$ Km or less.

We claim:

1. A low frequency radio position location system for aircraft or other vehicles and adapted for operating in conjunction with ground stations transmitting at a first radio frequency which is shifted in frequency by a small amount to a second radio frequency at fixed intervals, the shifting being carried out coherently with a defined transition point at the shifted time, said shifting frequency constituting a modulation frequency signal, comprising:
    (a) an RF receiver and amplifier,
    (b) limiting means connected to the amplifier for providing a square waveform output,
    (c) a phase-locked loop connected to the limiting means for providing a continuous output frequency signal precisely locked to the first frequency,
    (d) means for deriving a signal at the modulation frequency,
    (e) phase comparison means for comparing the phase relationship of the derived modulation frequency signal to the phase relationship of the said output frequency signal and the second frequency signal, the said derived modulation frequency signal and its phase information then available for providing distance information in relation to said ground stations.

2. A low frequency radio position location system as in claim 1 further comprising frequency conversion means connected between RF receiver and amplifier and the limiting means for reducing the frequencies of the said first and second radio signals to much lower intermediate frequencies and wherein the phase-locked loop and the phase comparison means operate in conjunction with these IF signals.

3. A low frequency radio position location system as in claim 1 wherein the signal at the modulation frequency is derived from the said output frequency signal by means of a frequency divider network connected to the output of the phase-locked loop.

4. A low frequency radio position location system as in claim 1 wherein the phase-locked loop comprises a phase detector for providing a phase error voltage signal, low pass filter means, and a voltage controlled crystal oscillator for providing the phase-locked frequency signal.

5. A low frequency radio position location system as in claim 1 further comprising a second phase-locked loop connected to the limiting means for providing a second continuous output frequency signal locked to the second frequency and wherein the phase comparison means compares the phase relationship of the derived modulation frequency signal to the phase relationship of the said output frequency signal and the said second continuous output frequency signal.

6. A low frequency radio position location system as in claim 1 wherein the phase comparison means comprises means for measuring the phase delay between the said continuous output frequency signal and the said second frequency signal, said measurements being taken at a rate equal to the said modulation frequency and means for comprising the phase relation of the said derived modulation frequency signal with the said phase delay and thus with the transition point.

* * * * *